Patented Jan. 2, 1951

2,536,075

UNITED STATES PATENT OFFICE 2,536,075

METHOD FOR REMOVING BAKED MAGNESIUM FLUORIDE FILMS FROM OPTICAL GLASS

Samuel W. MacNutt, Philadelphia, Pa.

No Drawing. Application August 8, 1945, Serial No. 609,711

6 Claims. (Cl. 134—3)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the removal of magnesium fluoride films from optical elements of glass or other material, and it has special reference to methods for removing films of the named type which have been evaporatively baked upon the optical surfaces of such elements.

One object of my invention is to provide a method of readily removing imperfect evaporatively baked magnesium fluoride films without marring the underlying optical surface of the glass or other element material.

Another object is to remove such imperfect films from "rejected" magnesium fluoride coated optics in an improved manner so that substantially 100% salvage of optical glass elements can be had.

A further object is to increase the speed and decrease the labor with which optical glass may be denuded of imperfect magnesium fluoride films.

An additional object is to decrease the skill and effort required to effect removal of such films.

In practicing my invention I attain the foregoing and other objects by treating the imperfectly coated optics with alkali and acid in accordance with a prescribed technique. Successively alternating these treatments in the unique manner herein outlined causes the magnesium fluoride film to be completely removed in a manner entirely unobvious to those skilled in the chemical art. The film removal thus achieved with the alternate acid-alkali treatment is far more successful than the aggregate results of equivalent treatments using either the acid or the alkali alone.

Problem to be solved

The use of magnesium fluoride films applied to optical glass elements in order to reduce reflection of "Fresnel" rays has long been known. Application of these films has recently been improved by a process which essentially consists of thermally evaporating and condensing the fluoride substance upon the glass in a substantial vacuum. The resultant optically effective coatings are highly durable and strongly resist deterioration by physical or chemical means.

In the course of mass producing such coated optics, it is not too surprising to find that many elements are rejected because of improperly applied films. Salvaging of these optical elements then becomes highly important due to the large labor and financial expenditures involved in their manufacture.

Many methods of decoating these films previously proposed have been found to be unsatisfactory. Physical means such as abrading, buffing, etc., involve the danger of pitting the optical surfaces. Chemical means heretofore found effective to remove these films have either attacked the glass so as to make it unfit for optical usage, or else have required long drawn-out treatments whose time consumption makes the process valueless for mass production scale operation.

What has been needed, therefore, and what I have accomplished by my herein disclosed method, is a relatively rapid chemical removal technique which does not mar or otherwise damage the underlying glass, and which requires very little skill for its utilization.

Improved magnesium fluoride decoating method

The novel and highly effective steps evolved by me for removing the extremely durable vacuum-baked magnesium fluoride coating are as follows: First the coated optical elements are immersed in or otherwise subjected to (as by swabbing) a saturated solution of potassium hydroxide maintained in suitable metal containers at a temperature of about 120° F. and permitted to soak for 10 minutes. A solution satisfactory for this purpose may be made by dissolving three parts by weight of technical grade alkali in two parts of water.

Following this treatment the optical elements are removed from the alkali and immediately rinsed in running tap water, then immersed in or otherwise subjected to (as by swabbing) a concentrated nitric acid bath for 30 seconds at room temperature. The nitric acid here used may also be of commercially available technical grade. Tap water is again used to rinse the acid free from the optics immediately following withdrawal of the glass pieces from this solution.

This cycle is repeated from three to five times depending on the thickness of the fluoride coating to be removed. The only caution to be observed, other than the normal care in handling acids and alkalies, is to make certain that the rinse water used is warm enough so as not to chill and thereby break the optics which have been made warm by the hot alkali. Generally, a rinse water temperature of approximately 90° F. is satisfactory. Keeping the rinse water running is preferable over using a still tank as the latter tends to build up a concentration of either the acid or alkali, whereas a substantially chemically neutral rinse is desirable.

An experienced operator can readily discern whether all the fluoride coating has been removed or whether additional treatment is necessary, by visually examining the optics under white light. Even the inexperienced operator can readily make this check by employing a set of standard reference coated elements. In relatively short order it is possible to immediately recognize the greenish appearance which indicates a half wave length magnesium fluoride coating, a bluish tint indicative of a quarter wave length, and tell-tale red, brown or light yellow reflections which show that vestiges of the fluoride coating remain. Optical elements may be completely decoated by my process and therefore show none if these colors, at the same time presenting surfaces of smooth, even appearance.

Effectiveness of my chemical decoating method

My method has successfully passed extensive tests in removing magnesium fluoride films from many common types of optical glass including borosilicate crown, baryta light flint, ordinary flint, extra dense flint and light barium crown. Little danger of attacking the glass was found to exist in the case of the first three types named; with the latter two types exercise of some caution was found necessary to prevent the glass surfaces from being affected by over exposure to the chemicals. However, by proper treatment, all five types can be safely and rapidly decoated of their imperfect magnesium fluoride films.

The success of my method may be even more thoroughly appreciated by comparing its results with those obtained when either the alkali or the acid is used alone. Such a comparison was in fact made in a series of experiments which will now be described.

A batch of sixteen barium crown glass "Porro" type prisms were carefully selected so that each had approximately equal coatings of vacuum baked magnesium fluoride of one-quarter wave length optical thickness. This batch was divided by random selection into four equal groups. One of these, group A, was decoated by my previously described unique method. Using the same temperature, soaking and rinsing techniques, but eliminating one of the two chemicals, each of two other sets of prisms were similarly treated. Group B was exposed only to the alkali; group C was exposed only to the acid. The fourth and last set, group D, was treated in accordance with my method, except that the process was begun with the acid and ended with the alkali bath and subsequent water rinse.

The results of these tests were as follows:

Group A: (potassium hydroxide followed by nitric acid) entirely removed the fluoride coatings from all four specimens after three treatment cycles.

Group B: (potassium hydroxide only) removed small amounts of coatings on two prisms after five treatment cycles, the coating on the other two prisms remaining unaffected.

Group C: (nitric acid only) had absolutely no effect on any of the four prisms after five treatment cycles.

Group D: (nitric acid followed by potassium hydroxide) decoated three specimens after three cycles. The next successive treatment removed Groups A and D were given five complete treatment cycles notwithstanding the fact that their coatings had earlier been removed, in order to see if the glass could be attacked. No effect on the glass was noticed, indicating that with regards to the possibility of such attack on the glass by the chemicals used an ample margin of safety exists in using my method.

It will be noticed that little difference occurs in changing the order of use of the alkali and the acid. Of course, after the first chemical is applied in either order, the cycle of treatment becomes identical, and the identity of results is to be expected.

The foregoing results clearly show the advantages of my unique process. By this method, two chemicals, each incapable of alone removing the extremely durable magnesium fluoride film, are made to successively contribute to the decoating process. The effect of their contributions is clearly not limited to the mere sum of their separate actions on the fluoride film; instead, the coating removal thereby effected is observed to be far greater than that predictable from the known individual actions of the two chemical components utilized by my method.

Advantages of my decoating method

In addition to the advantages of readily removing the fluoride coating without marring the underlying glass, my method has additional important attributes. Significant among these are the increased speed and decreased labor made possible by the exceedingly simple process which is involved. Moreover, the degree of skill and effort required is considerably less than that previously found necessary.

The net result of the foregoing has been the making of huge strides in the mass production of magnesium fluoride coated optics. The simplified decoating method has encouraged the coating of large numbers of optical glass elements in less time than ever before because fewer precautions are necessary to obtain acceptable film coatings. Manufacturers no longer have to fear the penalties of having expensive optics rejected because of faulty coatings. Such "rejects" are now entirely salvaged, and the time required therefore is far less than that of any previous procedure.

Summary

The preceding description has shown that I have provided a method which is capable of readily removing imperfect evaporatively baked magnesium fluoride films without marring the underlying optical glass; that this removal of the magnesium fluoride from "rejected" coated optics has been achieved in such improved manner as to make possible substantially 100% salvage of the optical glass elements; that my method increases the speed and decreases the labor with which optical glass may be denuded of imperfect magnesium fluoride films; and that the skill and effort required to effect removal of such films have been correspondingly decreased.

It will be readily understood by those skilled in the art that although my description has been confined to the removal of vacuum baked magnesium fluoride films from optical glass, other applications within the limits of the claims hereinafter set forth are possible without departing from the spirit of my invention.

I claim:

1. The process of removing baked magnesium fluoride coatings from optical glass elements which comprises alternately and repeatedly subjecting each element to be decoated to substantially saturated solutions of potassium hydroxide and a concentrated solution of nitric acid and interspersing such treatments by washing the element with water.

2. The process of removing baked magnesium fluoride coatings from optical glass elements which comprises subjecting each element to be treated to a substantially saturated solution of potassium hydroxide, thereafter washing said element with water, thereafter subjecting the element to a concentrated solution of nitric acid, thereafter again washing the element with water, and thereafter repeating this cycle of treatment until said magnesium fluoride coating has been totally removed.

3. In a method for removing from an optical glass element a baked coating of magnesium fluoride which has been applied to the element's optical surface, the steps which comprise immersing said coated element in a substantially saturated solution of potassium hydroxide, removing the element from said potassium hydroxide solution and thereafter rinsing it with water, immersing said element in concentrated nitric acid solution, removing said element from said nitric acid solution and thereafter again rinsing it with water, and repeating this cycle of treatment until said magnesium fluoride coating has been totally removed from said optical surface.

4. In a method for removing from an optical glass element a baked coating of magnesium fluoride which has been applied to the element's surface, the steps which comprise subjecting said coated element for about 10 minutes to a substantially saturated solution of potassium hydroxide kept at approximately 120° F., removing the element from said potassium hydroxide solution and thereafter rinsing it with water, subjecting said element for about 30 seconds to concentrated nitric acid solution kept at approximately room temperature, removing said element from said nitric acid solution and thereafter again rinsing it with water, and repeating this cycle of treatment until said magnesium fluoride coating has been totally removed from said surface.

5. In a method for removing from an optical glass element a baked coating of magnesium fluoride which has been evaporatively baked upon the element's optical surface, the steps which comprise subjecting said coated element to a substantially saturated solution of potassium hydroxide, removing the element from said potassium hydroxide solution and thereafter rinsing it with substantially chemically neutral water, subjecting said element to concentrated nitric acid solution kept at approximately room temperature, removing said element from said nitric acid solution and thereafter again rinsing it with substantially chemically neutral water, and repeating this cycle of treatment until said magnesium fluoride coating has been totally removed.

6. In a method for removing from an optical glass element a baked coating of magnesium fluoride which has been applied to the element's optical surface, the steps which comprise subjecting said coated element to concentrated nitric acid solution, removing the element from said nitric acid solution and thereafter rinsing it with water, subjecting said element to a substantially saturated solution of potassium hydroxide solution and thereafter again rinsing it with water, and repeating this cycle of treatment until said magnesium fluoride coating has been totally removed from said surface.

SAMUEL W. MacNUTT.

REFERENCES CITED

The following references are of record in the file of this patent:

UNITED STATES PATENTS

| Number | Name | Date |
| --- | --- | --- |
| 1,556,248 | Ohlwiler | Oct. 6, 1925 |
| 1,565,869 | Straw | Dec. 15, 1925 |
| 1,705,944 | Siegmund | Mar. 19, 1929 |

OTHER REFERENCES

Handbook of Chemistry and Physics, 28th edition, pages 406 and 407. Chemical Rubber Publishing Co., 1944. (Copy in Division 27.)